United States Patent [19]

Williams

[11] 3,941,199
[45] Mar. 2, 1976

[54] POWER TRANSMISSION FOR A VEHICLE
[75] Inventor: Richard D. Williams, Vancouver, Wash.
[73] Assignee: Warn Industries, Inc., Kent, Wash.
[22] Filed: July 22, 1974
[21] Appl. No.: 490,510

[52] U.S. Cl. ............... 180/44 R; 74/711; 74/665 A; 192/44
[51] Int. Cl.² ........................................ B60K 17/34
[58] Field of Search ............ 180/44, 24.09; 192/44, 192/47, 50; 74/650, 711, 665 R, 665 A–665 F

[56] References Cited
UNITED STATES PATENTS

| | | | |
|---|---|---|---|
| 2,851,115 | 9/1958 | Buckendale | 180/44 R X |
| 3,123,169 | 3/1964 | Young et al. | 192/44 X |
| 3,283,611 | 11/1966 | Weismann et al. | 74/650 |
| 3,295,625 | 1/1967 | Ordorica et al. | 180/44 R |
| 3,300,002 | 1/1967 | Roper | 180/44 R X |
| 3,447,396 | 6/1969 | Seliger | 74/650 |
| 3,451,496 | 6/1969 | Myers | 180/44 R |
| 3,481,436 | 12/1969 | Wilkowski | 180/44 X |
| 3,581,597 | 6/1971 | Reiersgaard | 192/44 X |
| 3,848,691 | 11/1974 | Dolan | 180/44 R |

Primary Examiner—Kenneth H. Betts
Attorney, Agent, or Firm—Graybeal, Barnard, Uhlir & Hughes

[57] ABSTRACT

A power transmission capable of transmitting power to both the front and rear sets of wheels of a vehicle, and also to automatically selectively transmit power to the slower rotating set of front or rear wheels. The transmission comprises an inner driving hub which acts through two interconnected sets of overrunning roller clutches to drive either or both of a forward and rear annular driven output member. The forward driven member is connected through a laterally extending chain drive to in turn drive a forwardly extending propeller shaft to transmit power to the front set of wheels to the vehicle. The rear driven member acts through a rearwardly extending propeller shaft to supply power to the rear set of wheels.

34 Claims, 4 Drawing Figures

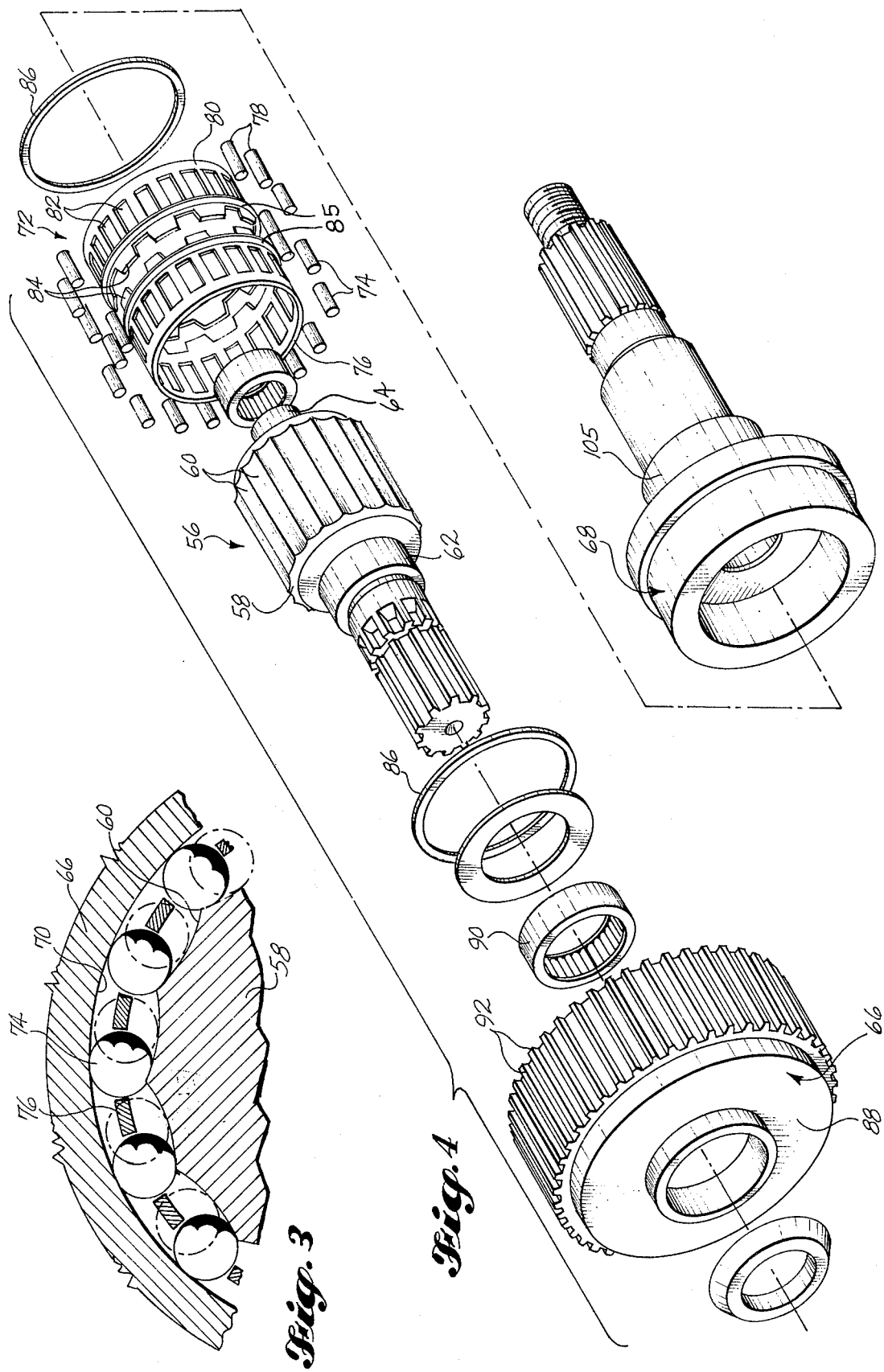

POWER TRANSMISSION FOR A VEHICLE

BACKGROUND OF THE INVENTION

1. Field of the Invention

The present invention relates generally to the field of four wheel drive power transmissions for vehicles, and more particularly to such transmissions which are capable of transmitting power to a slower set of wheels, while permitting free overrun of the faster traveling set of wheels.

2. Description of the Prior Art

There are in the prior art four wheel drive vehicles where all four wheels of the vehicle are in positive engagement with a power transmission. While such an arrangement is effective for a vehicle which is traveling over difficult terrain, it does have shortcomings. For example, when the vehicle is turning so that the front turning wheels are traveling in a wider radius than the rear wheels, since the rotational speed of all the wheels is the same by virtue of all the wheels being locked into the transmission, there is a scrubbing of the wheels. Further, it often happens that the several wheels of the vehicle have slightly different diameters due to greater wear of some of the tires. Thus, when the vehicle has left the rough terrain and remains in four wheel drive as it is cruising along a highway, there will be a scrubbing of the tire surfaces on the highway. This is due to the different linear rates of travel of the wheels, which results from the wheels all having the same rotational speed but slightly different diameters.

Thus, drive mechanisms have been devised which supply drive to only one set of wheels (usually the rear wheels), for normal cruise conditions, where the four wheels of the vehicle are traveling at nearly the same speed. However, in a situation where the driving set of wheels begin to overrun the non-driving set of wheels by some particular margin, the non-driving wheels become engaged to the power transmission to make up for the traction lost by the wheels that normally drive the vehicle. Sometimes this is done by providing the non-driving set of wheels with an overrunning clutch, and gearing the clutch to become engaged when a predetermined speed differential between the driving and non-driving wheels occurs. The disadvantage of this system is that unless the overrunning clutch is manually locked up, no four wheel drive will be obtained in reverse or under conditions of engine compression braking. Other systems of "Full Time" four wheel drive utilize a conventional differential to allow the front and rear drive shafts to deliver power while rotating at different speeds. These systems generally require a manual lock up device to prevent excessive wheel spin when encountering non-tractive surfaces.

Representative of prior art in the field of this invention are the following patents: U.S. Pat. No. 2,835,143, Kelbel; U.S. Pat. No. 2,959,237, Hill; U.S. Pat. No. 3,123,169 Young et al; U.S. Pat. No. 3,295,625, Ordorica et al; and U.S. Pat. No. 3,481,436, Wilkowski.

Also, as possible prior art, the applicant herein is aware of possible prior attempts to take a more or less conventional positive drive overrunning differential and connect this to distribute power between the front and rear wheels of a vehicle. (Such positive drive differentials supply power to the slower rotating wheel, while permitting the faster rotating wheel to overrun.) However, to the best knowledge of the applicant herein, such an arrangement has not been developed commercially. Also, it entails difficulty in locating the rear propeller shaft so that it can be connected to a centrally located rear wheel differential.

Also known in the prior art are clutching mechanisms applied to vehicle wheel hubs, which utilize an inner cammed member, roller clutch elements, and an outer generally cylindrical member capable of overrunning the inner member. Typical of such devices are those shown in U.S. Pat. No. 2,684,140; U.S. Pat. No. 2,884,101; U.S. Pat. No. 3,055,471, and U.S. Pat. No. 3,351,364. Also known in the prior art are various positive drive overrunning differential drive mechanisms, generally used to transmit power to the rear driving wheels of a vehicle. In such devices, there is a single driving member (usually an outer member) having cammed surfaces, two cylindrical driven members (usually inner members), and two sets of roller clutches for the two driven members. The roller clutch mechanisms are so arranged that the faster traveling of the two driven members is allowed to freely overrun, while power is delivered from the driving member to the slower moving driven member. Typical of such devices are those shown in U.S. Pat. No. 2,865,228; U.S. Pat. No. 2,966,075; U.S. Pat. No. 3,124,972; U.S. Pat. No. 3,173,309; U.S. Pat. No. 3,283,611; U.S. Pat. No. 3,447,396; U.S. Pat. No. 3,581,597; and U.S. Pat. No. 3,700,082. It is noted that the aforementioned U.S. Pat. No. 2,865,228, Weismann, discloses two configurations, one of which has a single outer driven member which drives one or both of the cylindrical inwardly positioned members, and a second configuration (shown in FIG. 5 of that patent) where there is a single inner driving member adapted to drive one or both of two outer driven members. This latter configuration is arranged to drive a pair of adjacent double tires, and yet permit overrun of either of the tires, for example in the situation where the vehicle to which its tires are mounted is making a turn.

SUMMARY OF THE INVENTION

The present invention relates to a power transmission for an automotive vehicle or the like, where power can be supplied to either or both of a front and rear set of wheels of the vehicle, while permitting a faster rotating set of wheels to overrun the other.

In the present invention, there is a transmission housing in which is rotatably mounted an inner driving member adapted to be connected to the power output from the vehicle engine, either directly or through a multi-speed power transmission. There is a first forward set and a second rear set of wedging clutch means mounted around said driving memeber so as to be able to be operatively engaged by cam surfaces of said driving member. Interconnecting the first and second wedging means is a cage means which permits only limited relative rotational movement between said first and second wedging means about the main axis of rotation of the driving member.

There is a first forward outer annular driven member having an interior generally cylindrical surface surrounding the first set of wedging means and arranged to engage the first set of wedging means in driving relationship with said driving member, and to be disengaged from the first set of wedging means in overrunning relationship with the driving member. The first driven member is operatively connected to a laterally extending output means, which in turn is adapted to engage a forwardly extending propeller shaft to power a forward set of wheels of the vehicle. The first driven member is mounted in journal bearings in a manner to resist the substantial lateral loading caused by the first driven member exerting a force through the laterally extending output means, and transmit such force into the transmission housing. In the preferred form this laterally extending output means is a chain and sprocket drive.

Additionally, there is a second rear outer annular driven member also having an interior generally cylindrical surface surrounding the second set of wedging means and arranged to engage the second set of wedging means in driving relationship with said driving member and to be disengaged from said second set of wedging means in overrunning relationship with said driving member. This second annular driven member is connected to second power output means adapted to be operatively connected to a rearwardly extending propeller shaft to supply power to the rear wheels of the automotive vehicle. This arrangement enables the rearwardly extending propeller shaft to be located along the longitudinal center line of the vehicle, so that it can conveniently be connected to a centrally located rear wheel differential. Thus, the force load on the second driven member is a torque load exerted about the common longitudinal axis of the transmission and the rearwardly extending propeller shaft.

As a further embodiment of the present invention, the power transmission of the present invention is utilized in combination with either a single positive drive overrunning differential (desirably positioned to transmit power to the rear set of wheels) or with two sets of positive drive overrunning differentials, one for the rear set of wheels and one for the front set of wheels. In the first form of this second embodiment, when power is delivered to the rear set of wheels, such power is delivered to the slower rotating of the two rear wheels. In the second form of the second embodiment, power is delivered to the wheel which is rotating at the slowest rate of speed of the four wheels. Thus, in the event that any three of the four wheels do not have proper traction, the fourth wheel that does have traction is still capable of driving the vehicle. Yet free overrun of any of the wheels is provided.

Other features of the present invention will become apparent from the following detailed description.

BRIEF DESCRIPTION OF THE DRAWINGS

FIG. 3 is a fragmentary sectional view of a portion of one of the clutches of the present invention, and FIG. 4 is an exploded view showing the main components of the transmission of the present invention.

DESCRIPTION OF THE PREFERRED EMBODIMENT

Figure 2:
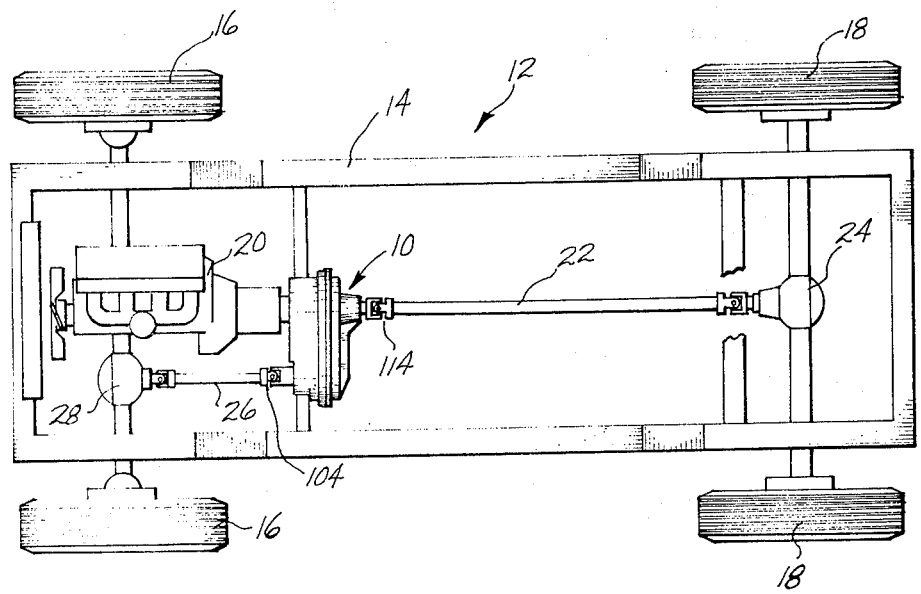
FIG. 2 is a semi-schematic top plan view of a chassis of an automotive vehicle incorporating the apparatus of the present invention.

The apparatus of the present invention is generally designated 10 and is illustrated in FIG. 2 installed in an automotive vehicle 12. The vehicle 12 comprises a chassis 14 to which are mounted front and rear sets of wheels 16 and 18, respectively. At the forward end of the vehicle 12 is an engine 20 which supplies power to the transmission apparatus 10. There are two output shafts connected to the transmission 10, a rearwardly extending propeller shaft 22 which transmits power to the rear wheels 18 through a rear end differential 24, and a laterally spaced forwardly extending propeller shaft 26 which transmits power to the front wheels 16 through a front differential 28.

The transmission apparatus 10 comprises a housing 30 positioned along the axial center line of the vehicle 12 just behind the engine 20, and having a laterally extending portion 32, which, as will be described more fully hereinafter, accomodates the laterally extending front wheel drive section of the transmission apparatus 10. Positioned in the forward central part of the housing 30 is a multispeed power transmission 34, which is or may be of conventional design. The particular multispeed transmission 34 shown herein is a prior art two-speed transmission, so it will be described only briefly herein.

Figure 1:
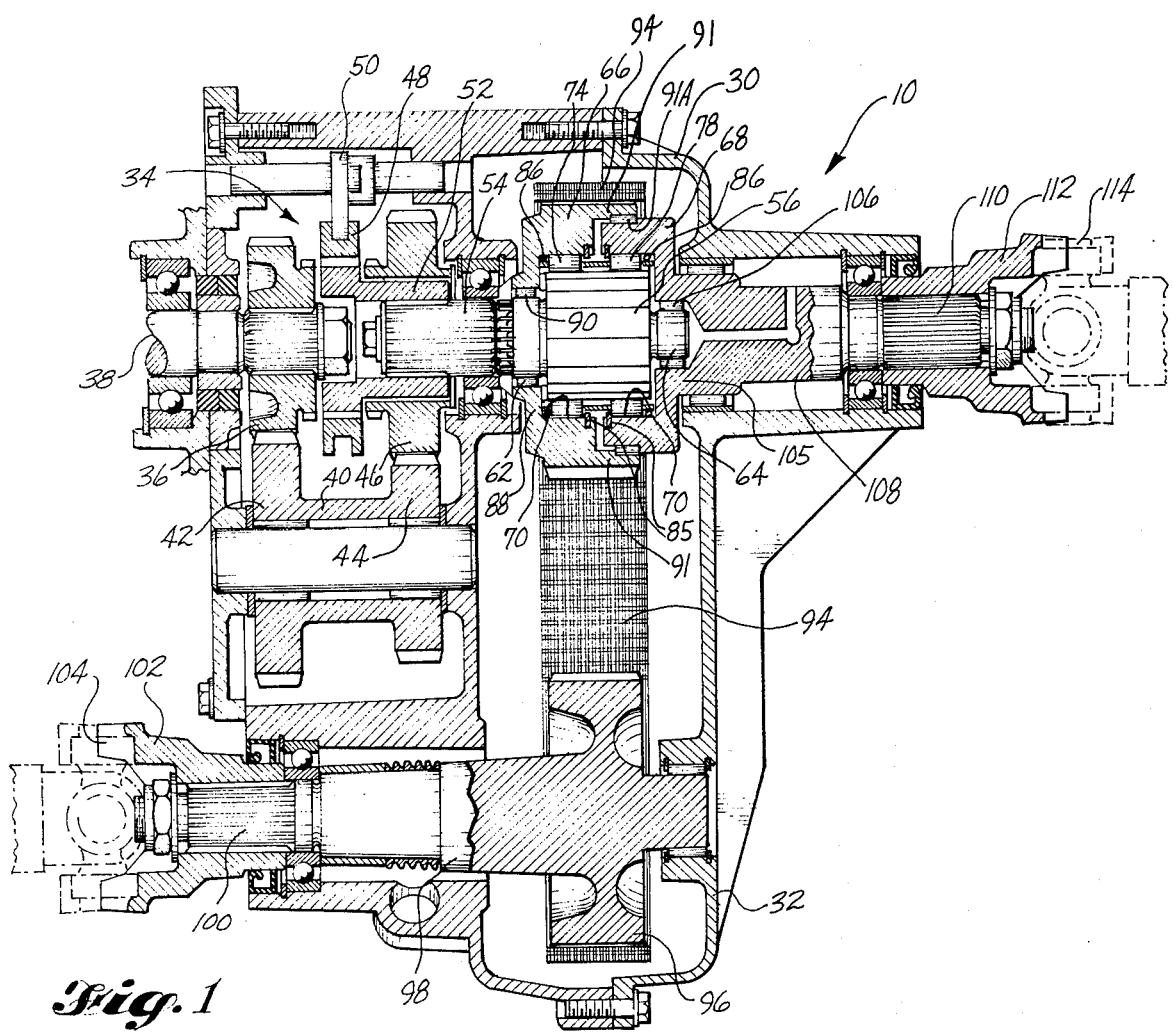
FIG. 1 is a horizontal sectional view of the apparatus of the present invention.

The transmission 34 comprises a first spur gear 36 connected to the output shaft 38 of the conventional automotive transmission of the engine 20. There is a hollow counter shaft 40 having two gears integrally connected thereto, a forward gear 42 which meshes with the gear 36, and a rear gear 44 that meshes with a gear 46 mounted for free rotation about the same longitudinal axis about which the gear 36 rotates. There is a slide mounted shifting gear 48 operated by a shifting fork 50 so as to be movable from its middle neutral position (shown in FIG. 1) to a forward position where it engages the gear 36, and to a rearward position where it engages the gear 46.

The output of the multispeed transmission is through a collar 52 formed integrally with the gear 48 and splined to a forward extension 54 of a power distribution input member 56. With the shifting gear 48 in its forward position, the drive is directly from the gear 36, through the shifting gear 48 and through the splined connection at 54 to the member 56. With the shifting gear 48 in its rear position, the drive is from the gear 36 through the gear 42, gear 44 and gear 46 to the shifting gear 48, which in turn transmits the drive through the splined member 54 to the power distributing drive member 56.

The power distribution input member or drive member 56 comprises a main generally cylindrical hub or drive portion 58 having its circumferential surface formed with a plurality of longitudinally extending cam surfaces 60. In addition, the drive member 56 has two cylindrical bearing portions 62 and 64 connected to, respectively, the front and rear sides of the hub portion 58. As shown in FIG. 3, each of the cam surfaces 60 is uniform along its length and is formed moderately concave in transverse section.

Surrounding the drive portion 56 are forward and rear driven members 66 and 68, respectively. Each of the driven members 66 and 68 has an interior cylindrical surface 70 which defines with the cammed outer surfaces 60 of the drive member 56 an annular space occupied by a wedging clutch mechanism, which in this embodiment is a roller clutch mechanism 72.

The roller clutch mechanism 72 comprises a first forward set of generally cylindrical roller clutch elements 74 mounted in a forward cage 76 and a rear set of roller clutch elements 78 mounted in a rear cage 80. As shown more clearly in FIG. 4, each of the cages 76 and 80 has a plurality of cutouts 82, each of which accomodates a related roller clutching element 74 or 78. The adjoining edge portions of the two cages 76 and 80 are formed with a plurality of interengaging tangs 84, which cause the two cages 76 and 80 to rotate together, but permit limited relative rotational movement between the two cages 76 and 80. A pair of snap rings 85 are positioned around the proximate portion of the cages 76 and 80 to pilot the cages 76 and 80 with respect to the driven members 66 and 68. These pilot rings 85 also help hold the rollers and cages 74–80 in place during assembly.

A pair of friction rings 86 are provided one on the forward and one on the rear circumferential edge portions of the cages 76 and 80 to provide frictional engagement between the cages 76 and 80 and their adjacent respective driven members 66 and 68. The friction rings 86 also center the cages 76 and 80 relative to driven members 66 and 68. An effective means of obtaining proper frictional engagement of the rings 86 is to make the cages 76 and 80 slightly out of round. Thus, as the rings 86 wear slightly, the cages 76 and 80 continue to press the rings 86 into engagement with the driven members 66 and 68. Also, as indicated above, the center pilot rings 85 properly shape and position the middle interlocking portion of the cages 76 and 80.

From the foregoing description of the driving member 56, the driven members 66 and 68, and the roller clutch assembly 72, it is readily apparent that the operation of these elements is such that power is delivered from the input member 56 to either or both of the driven members 66 and 68, depending upon the relative speed of rotation thereof. That is to say, in one mode of operation, with the driven members 66 and 68 rotating at the same rate of speed, both sets of roller clutch elements 74 and 78 become wedged between their respective cam surfaces 60 and the inner cylindrical surface of its related driven member 66 or 68. However, if one of the driven members 66 or 68 begins to rotate faster than the other, then its related roller clutch elements 74 or 78 are moved out of wedging engagement (shown in full lines in FIG. 3) to a free wheeling position centered in respective cam recesses (as shown in broken lines in FIG. 3), so that the overrunning member 66 or 68 is permitted to rotate free of any clutching engagement with the driving member 56. Since the two cage members 76 and 80 are interlocked by means of the tangs 84, the overrunning member 66 or 68 will not have its roller elements 74 or 78 become engaged in the opposite direction so as to inhibit the free overrun of the driven member 66 or 68.

The forward driven member 66 has an inwardly extending annular portion 88 which engages the aforementioned cylindrical forward extension of the driving member 56 through suitable bearing means 90. The forward driven member 66 also has a rearward annular extension 91 positioned around the rear driven member 68 and engaging the same through journal bearings 91A. The outer circumferential surface of the forward driven member 66 is formed with gear teeth 92 which mesh with a laterally extending power output in the form of a chain drive 94 which in turn engages a driven gear 96 positioned laterally to the left of the driven member 66 and journal mounted in the lateral housing portion 32. This driven gear 96 in turn has a forward extension 98 having a splined connection at 100 to a rear portion 102 of a universal coupling 104. The coupling 104 is in turn connected to the forward propeller shaft 26 which, as described above, drives the front wheels 16 through the forward differential 28. Since the components 92–96 of the laterally extending power output exert a substantial lateral force against the forward driven member 66, it is essential that the bearing means 90 and 91A are adequate to resist such lateral loading so as to permit the forward set of clutch rollers 74 to have sufficient clearance to permit proper engagement and disengagement.

The rear driven member 68 has an inwardly extending annular portion 105 which engages the aforementioned rear extension 64 of the driving member 56 through a related roller bearing means 106. The rear driven member 68 has a rearward shaft-like extension 108 that terminates in a power output in the form of a splined connection 110 with a forward portion 112 of a universal coupling 114 which is in turn connected to the aforementioned rear propeller shaft 22. It will be noted that the axis of rotation of the power output spline 112 is the same as that of the driving member 56 and of the output gear 48, with these coincident axes of rotation thus lying in the same vertical longitudinal plane, Thus, the loads on the rear driven member 68 are essentially torque loads exerted about the common longitudinal axis of rotation.

To describe the operation of the present invention, let it be assumed that the vehicle 12 is traveling over a highway or other ground surface in such a manner that the front and rear sets of wheels 16 and 18 are traveling at substantially the same speed. Under such conditions, both sets of roller clutch elements 74 and 78 will be in their engaged position so that power is transmitted to both of the power distribution driven members 66 and 68 from the driving member 56. With the forward driven member 66 acting through the chain and sprocket drive 92–96 and through the front propeller shaft 26, power is supplied to the forward set of wheels 16. Also, the rear power distribution driven member 68 is being driven by the driving member 56 to supply power through the rear propeller shaft 22 to the rear wheels 18.

In the situation where the two front wheels 16 or the two rear wheels 18 have a smaller average diameter than the other set of wheels (this usually occuring because of greater wear on either the front or rear sets of tires), the set of wheels which has the smaller average outer diameter (for the sake of example, the front wheels 16) will travel at a moderately greater rotational speed than the other set of wheels (in the present example the rear set of wheels 18). Under this set of conditions, the forward driven member 66 will tend to rotate moderately faster than the rear driven member 68. The result is that the forward driven member 66 begins to overrun its roller clutching elements 74 and move out of driving engagement with the driving member 56. As described above, due to the interlocking relationship of the two cage members 76 and 80, there will be no opposite wedging action of the roller elements 74, and the front driven member 66 remains in non-clutching engagement so long as the front set of wheels 16 are rotating at a faster speed than the rear wheels 18. Further, the bearing means 90 and 91A maintain the driven member 66 properly positioned about its axis of rotation to permit the rollers 74 to move properly into non wedging position. The over all effect is that the vehicle 12 is traveling in essentially what is a two wheel drive, with the other set of tires free wheeling.

Let us now examine a third situation where the vehicle is traveling over a slick surface, where one or more of the tires are not in proper frictional engagement with the ground surface. For the sake of example, let it be assumed that the rear wheels 18 begin to slip. In that situation, the rear driven member 68 continues to rotate, but is transmitting less power to the rear wheels. At the same time, the forward driven member 66 remains engaged with its roller elements 74 to transmit the majority of the power to the front wheels 16. Thus, it can be appreciated that in the situation where either the forward or rear set of wheels 16 or 18 is not in proper frictional engagement with the ground surface, the majority of power is transmitted to the non-slipping set of wheels.

During conditions when power is transmitting from the wheels back to the engine, such as when descending a hill, then the function of the mechanism will be reversed. The rollers are wedged between their respective cam surfaces 60 and inner cylindrical surface of (what is now) its driver member 66 or 68. If one of its members 66 or 68 begins to rotate slower than the other, then its related roller clutch elements 74 or 76 are moved out of wedging engagement to a free wheeling position. The cage interlocking tangs 84 limit movement of the cages as previously described. It is obvious from the symmetry of the driving and driven members, that the mechanism will work equally well in the forward and reverse direction.

As a second embodiment of the present invention, either or both of the front and rear differentials 28 and 24 can be made as a positive drive overrunning differential, a number of which are shown in the prior art (e.g. as shown in U.S. Pat. No. 2,865,228; U.S. Pat. No. 2,966,075; U.S. Pat. No. 3,124,972; U.S. Pat. No. 3,173,309; U.S. Pat. No. 3,283,611; U.S. Pat. No. 3,447,396; U.S. Pat. No. 3,581,597, and U.S. Pat. No. 3,700,082). Such differentials operate in a manner that power is delivered to the slower moving of the wheels to which the differential transmits power. Since such positive drive differential mechanisms are well known in the prior art, these will not be described in any detail herein.

With reference to FIG. 2, the first form of the second embodiment is accomplished by providing a positive drive overrunning differential for the rear differential 24. With this arrangement, the mode of operation is in most respects the same as in the first embodiment. However, there is an additional feature in the mode of operation of this first form of the second embodiment. In the event power is being delivered to the rear set of wheels 18 and one of the rear wheels 18 loses traction, power is delivered to the rear wheel 18 that has traction so that the vehicle still has traction with respect to the ground surface.

In the second form of the second embodiment of the present invention, both the front and rear differentials 28 and 24 are positive drive overrunning differentials, such as one of those in the differential related patents noted above. The mode of operation is largely the same as in the first embodiment, and also as the first form of the second embodiment. However, there is the further feature that in the event that any three of the four wheels 16 and 18 lose traction, power is still delivered to the remaining wheel which still has traction. Also, when the vehicle is traveling through a turn, so that the inside rear wheel is traveling the shortest linear distance, the other three wheels are permitted to overrun, while power is delivered from the vehicle to the ground surface through the inside rear wheel.

What is claimed is:

1. In a ground traveling vehicle having a forward and rearward set of wheels and an engine to drive said wheels, a four wheel drive power transmission apparatus comprising;
    a. a housing having a front end and rear end,
    b. an inner driving member rotatably mounted in said housing about a longitudinal axis and adapted to be connected to a power output from the vehicle engine, said driving member having radially outwardly facing, longitudinally aligned, driving cam surfaces,
    c. a first forward set and a second rear set of wedging clutch elements mounted around said driving member for circumferential movement with respect to the driving member between a released position and driven position where the clutch elements are engaged by the driving cam surfaces,
    d. a pair of cylindrical, longitudinally aligned cages holding the clutch elements, said cages engaging each other to permit limited relative rotation of the sets of clutch elements with respect to one another about said axis,
    e. a first forward outer annular driven member having an interior generally cylindrical surface surrounding said first set of wedging clutch elements and arranged to engage said first set of wedging clutch elements in driving relationship with said driving member and to disengage from said first set of wedging clutch elements in overrunning relationship with said driving member,
    f. a first power output means mounted to said first driven member and adapted to be connected to power transmitting means extending laterally therefrom and forwardly to connect to the forward set of wheels of the vehicle, with said first power output means having journal bearing means for said first power output means arranged to withstand laterally directed force loads from said laterally extending power transmitting means,
    g. a second rearward outer annular driven member having an interior generally cylindrical surface surrounding said second set of wedging clutch elements and arranged to engage said second set of wedging clutch elements in driving relationship with said driving member and to disengage from said second set of wedging clutch elements in overrunning relationship with said driving member, and
    h. a second power output means mounted to said second driven member and adapted to engage a rearwardly extending power transmitting means connected to the rearward set of wheels of the vehicle.

2. The apparatus as recited in claim 1, wherein said second power output means has an axis of rotation lying in a longitudinal vertical plane positioned at the longitudinal axis of rotation of the driving member, whereby said second power output means can conveniently be connected along a central longitudinal axis to a centrally located rear end differential of the vehicle.

3. The apparatus as recited in claim 2, wherein said second power output means has the same axis of rotation as said driving member.

4. The apparatus as recited in claim 3, wherein said second power output means is substantially integral with said second annular driven member.

5. The apparatus as recited in claim 1, wherein said first power output means comprises exterior gear teeth on said first driven member for operative engagement with said laterally extending power transmitting means.

6. The apparatus as recited in claim 5, further comprising, as said laterally extending power transmitting means, a laterally extending chain and sprocket drive and a laterally placed gear member engaging the chain and sprocket drive and adapted to be engaged to the forward portion of said power transmitting means for the forward wheels of the vehicle.

7. The apparatus as recited in claim 5, wherein said first driven member has an outer annular portion surrounding a portion of said second driven member, and having a radial bearing means therebetween to resist lateral force loads from said lateral power transmitting means.

8. The apparatus as recited in claim 1, wherein there is additionally a multispeed transmission in said housing forward of said driving member and operatively connected thereto, said multispeed transmission having an output having an axis of rotation coincident with said driving member and also coincident with the second power output means.

9. The apparatus as recited in claim 1, wherein said first and second driven members each has an inwardly extending radial portion having a radial bearing relationship with said driving member, and enclosing said first and second wedging clutch elements therebetween.

10. The apparatus as recited in claim 1, further characterized in that each of said cages is eccentrically formed, said combination further comprising friction ring means for each of said two cage members to engage respective first and second driven members, with the eccentric configuration of said cage members providing proper frictional engagement of the friction ring means with said first and second driven members.

11. The apparatus as recited in claim 10, wherein said first and second cages have adjacent interconnecting portions, said apparatus further comprising pilot ring means engaging the adjoining portions of said cage means for proper location within said first and second driven members.

12. The apparatus as recited in claim 1, wherein said clutch comprises roller clutch elements.

13. In a ground traveling vehicle having a forward and a rearward set of wheels and an engine to drive said wheels, the combination comprising:
 a. a power transmission positioned behind said engine and longitudinally aligned therewith, said transmission comprising:
  1. a housing having a front end and a rear end,
  2. an inner driving member rotatably mounted in said housing about a longitudinal axis and adapted to be connected to a power output from the vehicle engine, said driving member having radially outwardly facing, longitudinally aligned, driving cam surfaces,
  3. a first forward set and a second rear set of wedging clutch elements mounted around said driving member for circumferential movement with respect to the driving member between a released position and driven position where the clutch elements are engaged by the driving cam surfaces,
  4. a pair of cylindrical, longitudinally aligned cages holding the clutch elements, said cages engaging each other to permit limited relative rotation of the sets of clutch elements with respect to one another about said axis,
  5. a first forward outer annular driven member having an interior generally cylindrical surface surrounding said first set of wedging clutch elements and arranged to engage said first set of wedging clutch elements in driving relationship with said driving member and to disengage from said first set of wedging clutch elements in overrunning relationship with said driving member,
  6. a first power output means mounted to said first driven member and adapted to be connected to power transmitting means extending laterally therefrom and forwardly to connect to the forward set of wheels of the vehicle, with said first power output means having journal bearing means for said first power output means arranged to withstand laterally directed force loads from said laterally extending power transmitting means,
  7. a second rearward outer annular driven member having an interior generally cylindrical surface surrounding said second set of wedging clutch elements and arranged to engage said second set of wedging clutch elements in driving relationship with said driving member and to disengaging from said second set of wedging clutch elements in overrunning relationship with said driving member, and
  8. a second power output means mounted to said second driven member and adapted to engage a rearward extending power transmitting means connected to the rearward set of wheels of the vehicle,
 b. a positive drive overrunning differential operatively connected between one of the front and rear sets of wheels and also operatively connected to the related one of the power transmission front and rear driven members that transmits power to the set of wheels between which the differential is interconnected.

14. The combination as recited in claim 13, wherein said positive drive overrunning differential is operatively connected between the rear set of wheels and is positioned at a central location between the two rear wheels in longitudinal alignment with said power transmission, said combination further comprising centrally located, longitudinally aligned propeller shaft means interconnecting the second power output means of the power transmission and the differential.

15. The combination as recited in claim 14, wherein said second power output means of the power transmission has an axis of rotation lying in a longitudinal vertical plane positioned at the longitudinal axis of rotation of the driving member, whereby said second power output means can conveniently be connected along a central longitudinal axis to the centrally located rear end differential of the vehicle.

16. The combination as recited in claim 15, wherein said second power output means has the same axis of rotation as said driving member.

17. The combination as recited in claim 16, wherein said second power output means is substantially integral with said second annular driven member.

18. The combination as recited in claim 13, wherein there is additionally a multispeed transmission in said housing forward of said driving member and operatively connected thereto, said multispeed transmission having an output having an axis of rotation coincident with said driving member and also coincident with the second power output means.

19. The combination as recited in claim 14, further comprising:
   a. a second positive drive overrunning differential operatively connected between the forward set of wheels,
   b. a forward power transmitting means having a laterally extending portion connected to said first driven member of the power transmission, and a forwardly extending propeller shaft means laterally spaced from the power transmission and interconnecting the laterally extending portion of the forward power transmitting means to the second differential.

20. The combination as recited in claim 19, wherein said first power output means comprises exterior gear teeth on said first driven member for operative engagement with said laterally extending portion of the power transmitting means.

21. The combination as recited in claim 20, further comprising as said laterally extending portion of the power transmitting means, a laterally extending chain and sprocket drive and a laterally placed gear member engaging the chain and sprocket drive and adapted to be engaged to the forward propeller shaft means.

22. The apparatus as recited in claim 21, wherein said first driven member has an outer annular portion surrounding a portion of said second driven member, and having radial bearing means therebetween to resist lateral force loads from said lateral power transmitting means.

23. In a ground traveling vehicle having a forward and a rearward set of wheels and an engine to drive said wheels, a four wheel drive power transmission apparatus comprising:
   a. a housing having a front end and a rear end,
   b. a multispeed transmission located in a forward location of said housing,
   c. a power transfer apparatus located in said housing rearwardly of said multi-speed transmission and comprising:
      1. an inner driving member rotatably mounted in said housing about a longitudinal axis and adapted to be connected to a power output from the multi-speed transmission, said driving member having radially outwardly facing, longitudinally aligned, driving cam surfaces,
      2. a first forward set and a second rear set of wedging clutch elements mounted around said driving member for circumferential movement with respect to the driving member between a released position and driven position where the clutch elements are engaged by the driving cam surfaces,
      3. a pair of cylindrical, longitudinally aligned cages holding the clutch elements, said cages engaging each other to permit limited relative rotation of the sets of clutch elements with respect to one another about said axis,
      4. a first forward outer annular driven member having an interior generally cylindrical surface surrounding said first set of wedging clutch elements and arranged to engage said first set of wedging clutch elements in driving relationship with said driving member and to disengage from said first set of wedging clutch elements in over- running relationship with said driving member,
      5. a first power output means mounted to said first driven member, said first power output means having journal bearng means for said first power output means arranged to withstand laterally directed force loads thereon,
      6. a second rearward outer annular driven member having an interior generally cylindrical surface surrounding said second set of wedging clutch elements and arranged to engage said second set of wedging clutch elements in driving relationship with said driving member and to disengage from said second set of wedging clutch elements in overrunning relationship with said driving member, and
      7. a second power output means mounted to said second driven member and adapted to engage a rearwardly extending power transmitting means connected to the rearward set of wheels of the vehicle,
   d. a lateral power transmitting means mounted within said housing and connected to said first power output means so as to extend laterally therefrom, said lateral power transmitting means being adapted to be connected to forward propeller shaft means for the forward wheels.

24. The apparatus as recited in claim 23, wherein said second power output means has an axis of rotation lying in a longitudinal vertical plane positioned at the longitudinal axis of rotation of the driving member, whereby said second power output means can conveniently be connected along a central longitudinal axis to a centrally located rear end differential of the vehicle.

25. The apparatus as recited in claim 24, wherein said second power output means has the same axis of rotation as said driving member.

26. The apparatus as recited in claim 25, wherein said second power output means is substantially integral with said second annular driven member.

27. The apparatus as recited in claim 23, wherein said first power output means comprises exterior gear teeth on said first driven member for operative engagement with said laterally extending power transmitting means.

28. The apparatus as recited in claim 27, further comprising, as said lateral power transmitting means, a laterally extending chain and sprocket drive and a laterally spaced gear member engaging the chain and sprocket drive and adapted to be engaged to said forward propeller shaft means.

29. The apparatus as recited in claim 27, wherein said first driven member has an outer annular portion surrounding a portion of said second driven member, and having radial bearing means therebetween to resist lateral force loads from said lateral power transmitting means.

30. The apparatus as recited in claim 23, wherein said multi-speed transmission has an output having an axis of rotation coincident with said driving member and also coincident with the second power output means.

31. The apparatus as recited in claim 23, wherein said first and second driven members each has an inwardly extending radial portion having a radial bearing relationship with said driving member, and enclosing said first and second wedging clutch elements therebetween.

32. The apparatus as recited in claim 23, further characterized in that said locating means comprises first and second interconnected cage members, each of which is eccentrically formed, said apparatus further comprising friction ring means for each of said two cage members to engage respective first and second driven members, with the eccentric configuration of said cage members providing proper frictional engagement of the friction ring means with said first and second driven members.

33. The apparatus as recited in claim 32, wherein said first and second cages have adjacent interconnecting portions, said apparatus further comprising pilot ring means engaging the adjoining portions of said cage means for proper location within said first and second driven members.

34. The apparatus as recited in claim 23, wherein said clutch elements comprise roller clutch elements.

* * * * *